US009586263B2

(12) United States Patent
Frota de Souza Filho et al.

(10) Patent No.: US 9,586,263 B2
(45) Date of Patent: Mar. 7, 2017

(54) TOOL HOLDER HAVING IMPROVED INTERNAL COOLANT DELIVERY

(71) Applicant: Kennametal Inc., Latrobe, PA (US)

(72) Inventors: Ruy Frota de Souza Filho, Latrobe, PA (US); Calvin L. Hiles, Ligonier, PA (US)

(73) Assignee: KENNAMETAL INC, Latrobe, PA (US)

( * ) Notice: Subject to any disclaimer, the term of this patent is extended or adjusted under 35 U.S.C. 154(b) by 331 days.

(21) Appl. No.: 14/296,785

(22) Filed: Jun. 5, 2014

(65) Prior Publication Data

US 2015/0352640 A1 Dec. 10, 2015

(51) Int. Cl.
*B23B 29/00* (2006.01)
*B23B 27/10* (2006.01)
*B23B 29/12* (2006.01)

(52) U.S. Cl.
CPC ............. *B23B 27/10* (2013.01); *B23B 29/12* (2013.01); *B23B 2250/12* (2013.01); *Y10T 407/14* (2015.01)

(58) Field of Classification Search
CPC ....... B23B 27/10; B23B 2250/12; B23C 5/28; B23Q 11/10
See application file for complete search history.

(56) References Cited

U.S. PATENT DOCUMENTS

| | | | | |
|---|---|---|---|---|
| 3,364,800 A | * | 1/1968 | Benjamin | ............... B23B 51/06 279/20 |
| 4,409,868 A | * | 10/1983 | Huddle | ................ B23B 27/007 407/11 |
| 4,621,547 A | | 11/1986 | Yankoff | |
| 4,955,264 A | | 9/1990 | Armbrust | |
| 5,148,728 A | | 9/1992 | Mazurkiewicz | |
| 5,237,894 A | * | 8/1993 | Lindeke | .................. B23B 27/10 407/11 |
| 5,340,242 A | | 8/1994 | Armbrust et al. | |
| 5,388,487 A | * | 2/1995 | Danielsen | ............... B23B 29/04 279/2.08 |
| 6,299,388 B1 | * | 10/2001 | Slabe | ...................... B23B 27/10 407/100 |
| 6,312,199 B1 | | 11/2001 | Sjödén | |

(Continued)

FOREIGN PATENT DOCUMENTS

KR 100831911 5/2008

*Primary Examiner* — Will Fridie, Jr.
(74) *Attorney, Agent, or Firm* — Matthew S. Bedsole

(57) ABSTRACT

A tool holder for carrying a cutting insert wherein the cutting insert is useful for the removal of material during a material removal operation. The tool holder includes a tool holder body. The tool holder body includes a pocket adapted to carry the cutting insert, a coolant inlet in communication with a pressurized source of coolant, a coolant chamber having a central region, an upstream coolant passage having a central longitudinal upstream coolant passage axis, and a downstream coolant passage having a central longitudinal downstream coolant passage axis. The upstream coolant passage opens into the coolant chamber. The upstream coolant passage has an orientation relative to the coolant chamber so that the central longitudinal upstream coolant passage axis is offset from the central region of the coolant chamber whereby coolant flows into the coolant chamber in a tangential fashion.

7 Claims, 8 Drawing Sheets

(56) References Cited

U.S. PATENT DOCUMENTS

| | | | |
|---|---|---|---|
| 6,443,672 B1* | 9/2002 | Lagerberg | B23B 27/10 |
| | | | 407/11 |
| 6,471,448 B1* | 10/2002 | Lagerberg | B23Q 11/005 |
| | | | 407/11 |
| 8,256,999 B2 | 9/2012 | Prichard et al. | |
| 2002/0122698 A1 | 9/2002 | Lagerberg | |
| 2002/0127067 A1* | 9/2002 | Lagerberg | B23B 29/046 |
| | | | 407/11 |
| 2003/0223831 A1* | 12/2003 | Viens | B23C 5/006 |
| | | | 408/60 |
| 2008/0124180 A1 | 5/2008 | Breisch | |
| 2008/0131215 A1 | 6/2008 | Sjoo | |
| 2010/0272529 A1* | 10/2010 | Rozzi | B23C 5/207 |
| | | | 408/56 |
| 2014/0334887 A1* | 11/2014 | Flolo | B23B 27/10 |
| | | | 407/11 |

* cited by examiner

TOOL HOLDER HAVING IMPROVED INTERNAL COOLANT DELIVERY

BACKGROUND

The invention pertains to a tool holder, which retains a cutting insert for engaging a workpiece in a material removal operation, wherein the tool holder provides for internal coolant delivery to the cutting insert during a material removal operation. More specifically, the invention pertains to such a tool holder wherein the structure of the coolant passage in the tool holder improves efficiency of coolant delivery to the cutting insert during a material removal operation. In this regard, the structure of the coolant passage provides for coolant flow in a tangential direction so that flowing coolant does not abruptly impinge a surface so the coolant flow is essentially uninterrupted.

Heretofore, the delivery of coolant to a cutting insert during the material removal operation has been used to improve the overall removal operation. Exemplary patents that disclose various ways to deliver coolant to the cutting insert during the material removal operation are identified as follows: U.S. Pat. No. 4,955,264 to Armbrust, U.S. Pat. No. 5,148,728 to Mazurkiewicz, U.S. Pat. No. 5,340,242 to Armbrust et al., U.S. Pat. No. 6,471,448 to Lagerberg, U.S. Pat. No. 5,388,487 to Danielson, U.S. Pat. No. 8,256,999 to Prichard et al., and U.S. Pat. No. 6,443,672 to Lagerberg.

While existing ways to deliver coolant to the cutting insert, and especially to deliver coolant to the vicinity of the interface between the cutting insert and the workpiece, have performed in a satisfactory manner, there remains the need to improve the efficiency of the delivery of coolant. One drawback of earlier ways to deliver coolant to the interface between the cutting insert and the workpiece during the material removal operation is the occurrence of the flowing coolant abruptly impinging a surface so as to interrupt the coolant flow. This abrupt impingement could cause turbulence and decrease the efficiency of the coolant delivery to the cutting insert. This can be the case especially when under high pressure (e.g., a pressure equal to about 70 bar). Therefore, it would be highly desirable to provide a tool holder, which retains a cutting insert for engaging a workpiece in a material removal operation, wherein the tool holder provides for internal coolant delivery in such a fashion that the flowing coolant does not abruptly impinge the surface defining the coolant chamber. It would highly desirable to provide a tool holder, which retains a cutting insert for engaging a workpiece in a material removal operation, wherein the tool holder provides for internal coolant delivery in such a fashion that increases the efficiency of the delivery of the flowing coolant to the cutting insert.

SUMMARY OF THE INVENTION

In one form, the invention is a tool holder for carrying a cutting insert wherein the cutting insert is useful for the removal of material during a material removal operation. The tool holder comprises a tool holder body comprising a pocket adapted to carry the cutting insert, a coolant inlet in communication with a pressurized source of coolant, a coolant chamber having a central region, an upstream coolant passage having a central longitudinal upstream coolant passage axis, and a downstream coolant passage having a central longitudinal downstream coolant passage axis. The downstream coolant passage terminating in an opening. The upstream coolant passage opening into the coolant chamber, and the upstream coolant passage having an orientation relative to the coolant chamber so that the central longitudinal upstream coolant passage axis is offset from the central region of the coolant chamber whereby coolant flows into the coolant chamber in a tangential fashion.

In another form, the invention is a tool holder for carrying a cutting insert wherein the cutting insert is useful for the removal of material during a material removal operation. The tool holder comprises a tool holder body comprising a pocket adapted to carry the cutting insert, a coolant inlet in communication with a pressurized source of coolant, a coolant chamber having a central region, an upstream coolant passage having a central longitudinal upstream coolant passage axis. The tool holder further contains a plurality of downstream coolant passages wherein each downstream coolant passage has a central longitudinal downstream coolant passage axis. Each of the downstream coolant passages terminating in an opening. The upstream coolant passage opening into the coolant chamber, and the upstream coolant passage having an orientation relative to the coolant chamber so that the central longitudinal upstream coolant passage axis is offset from the central region of the coolant chamber whereby coolant flows into the coolant chamber in a tangential fashion.

In still another form, the invention is a tool holder for carrying a cutting insert wherein the cutting insert is useful for the removal of material during a material removal operation. The tool holder comprises a tool holder body comprising a pocket adapted to carry the cutting insert, a coolant inlet in communication with a pressurized source of coolant, a coolant chamber having a central region, an upstream coolant passage having a central longitudinal upstream coolant passage axis. The tool holder further contains a central downstream coolant passageway having a central nozzle with a central nozzle passage attached thereto. A lateral downstream coolant passageway, which has a lateral nozzle passage, is on each side of the central downstream coolant passageway. The central nozzle passage is larger than either one of the lateral nozzle passages. The upstream coolant passage opens into the coolant chamber and has an orientation relative to the coolant chamber so that the central longitudinal upstream coolant passage axis is offset from the central region of the coolant chamber whereby coolant flows into the coolant chamber in a tangential fashion.

BRIEF DESCRIPTION OF THE DRAWINGS

The following is a brief description of the drawings that form a part of this patent application.

DETAILED DESCRIPTION

Figure 1:
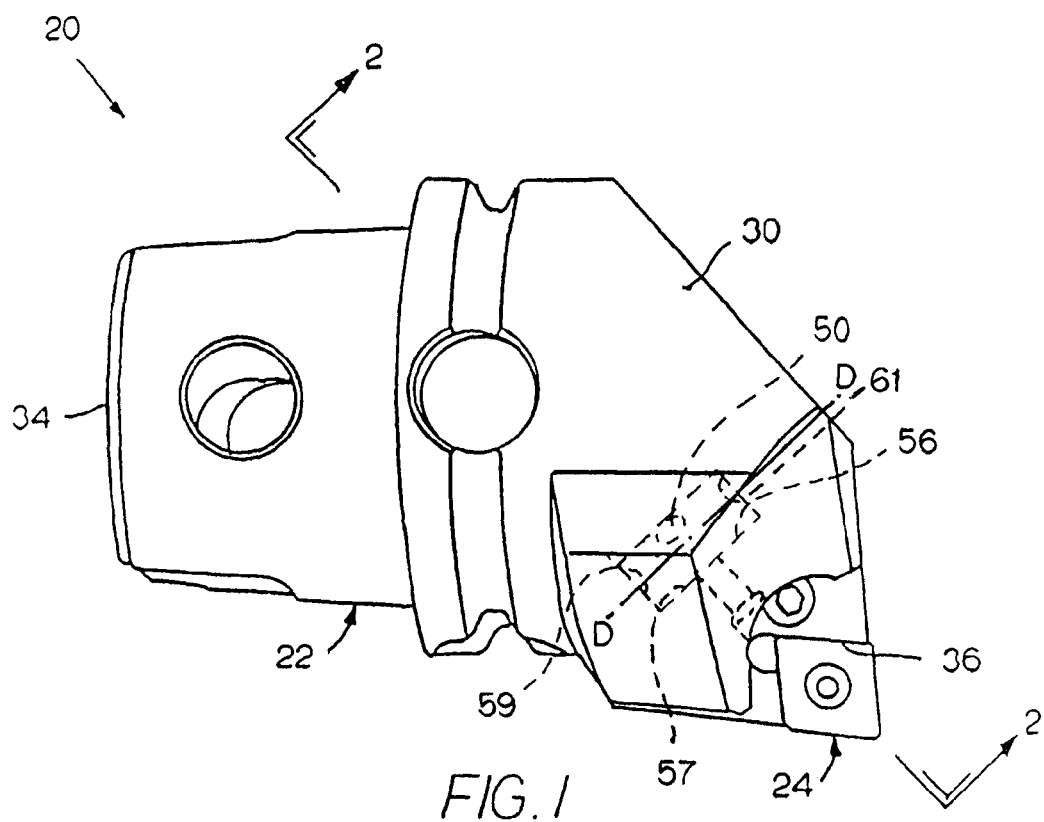
FIG. 1 is a top view of one specific embodiment of a cutting assembly comprising a tool holder with a cutting insert attached thereto wherein the tool holder has one nozzle that delivers coolant to the cutting insert.
Figure 2:
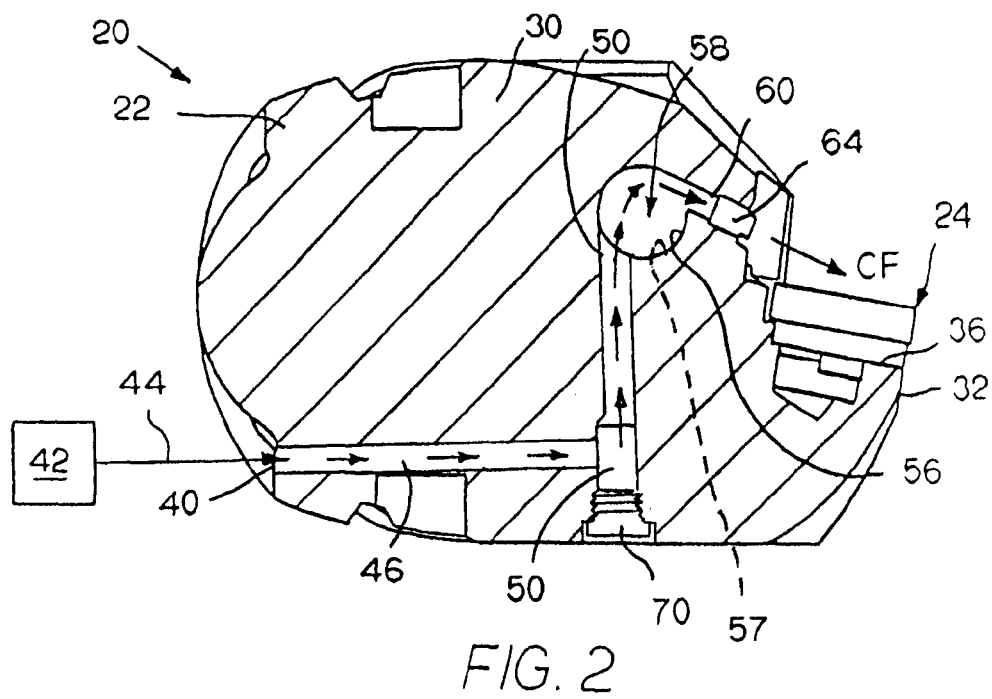
FIG. 2 is a cross-sectional view of the cutting assembly of FIG. 1 taken along section line 2-2 of FIG. 1.
Figure 2A:
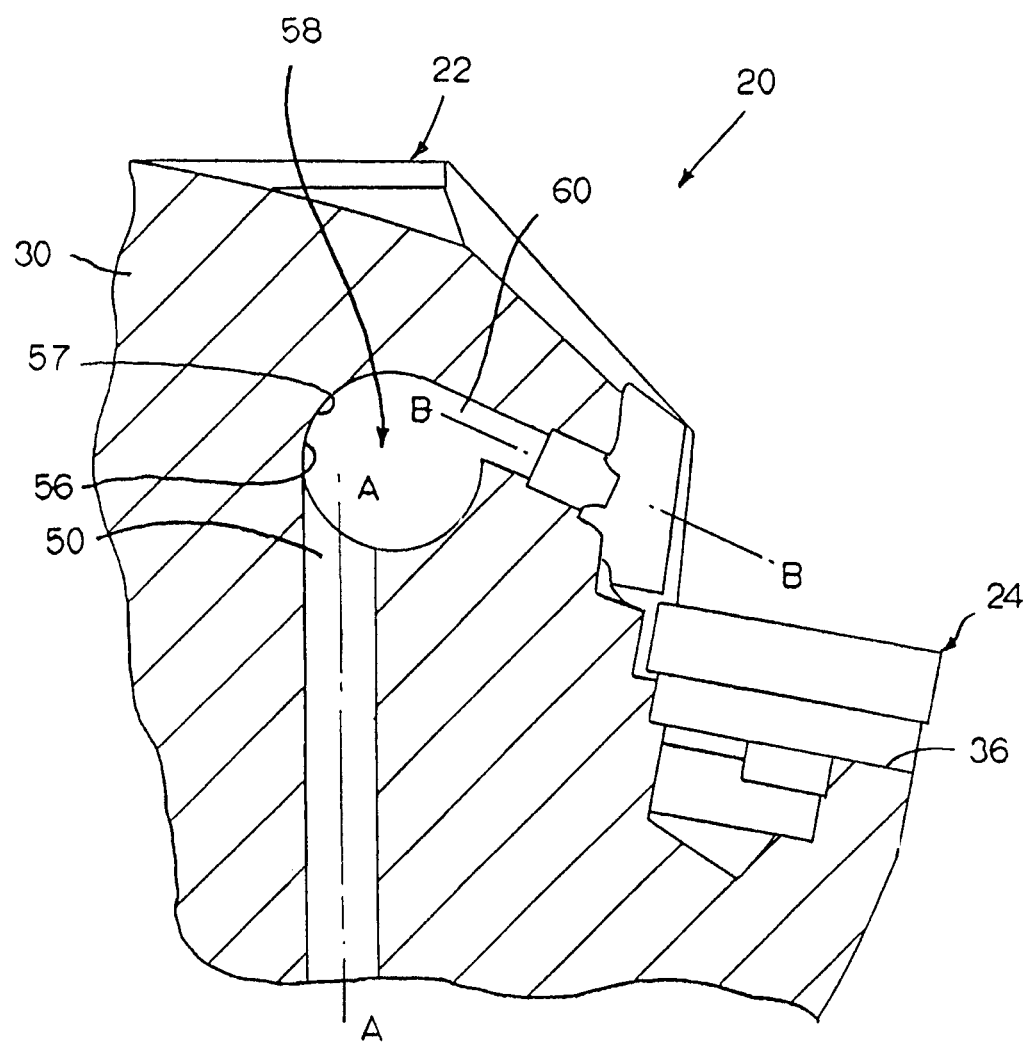
FIG. 2A is an enlarged cross-sectional view of the joinder of the coolant chamber with the upstream coolant passage and the joinder between the coolant chamber and the downstream coolant passage of the cutting assembly of FIG. 1.
Figure 2B:
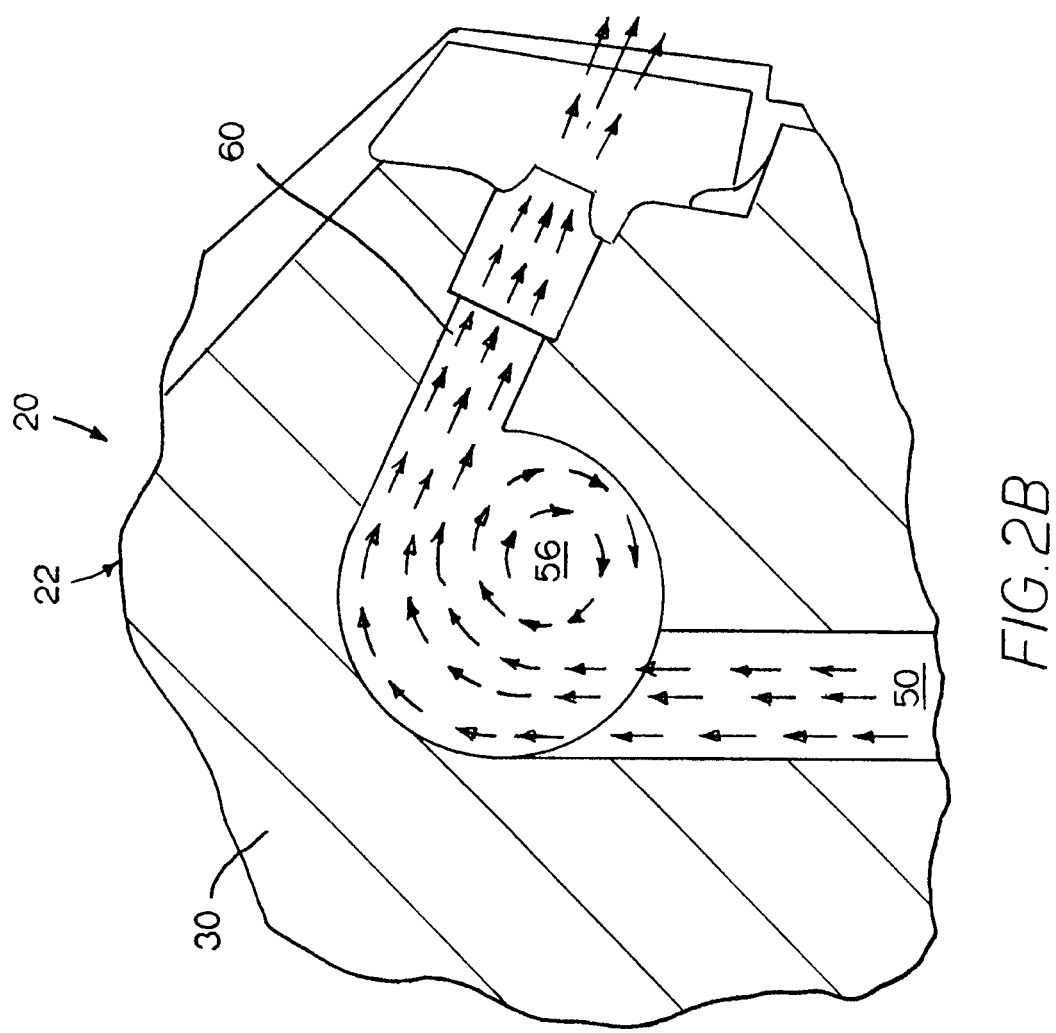
FIG. 2B is an enlarged cross-sectional view showing the joinder of the coolant chamber with the upstream coolant passage and the joinder between the coolant chamber and the downstream coolant passage of the cutting assembly of FIG. 1 wherein the coolant flow is illustrated by arrows.
Figure 2C:
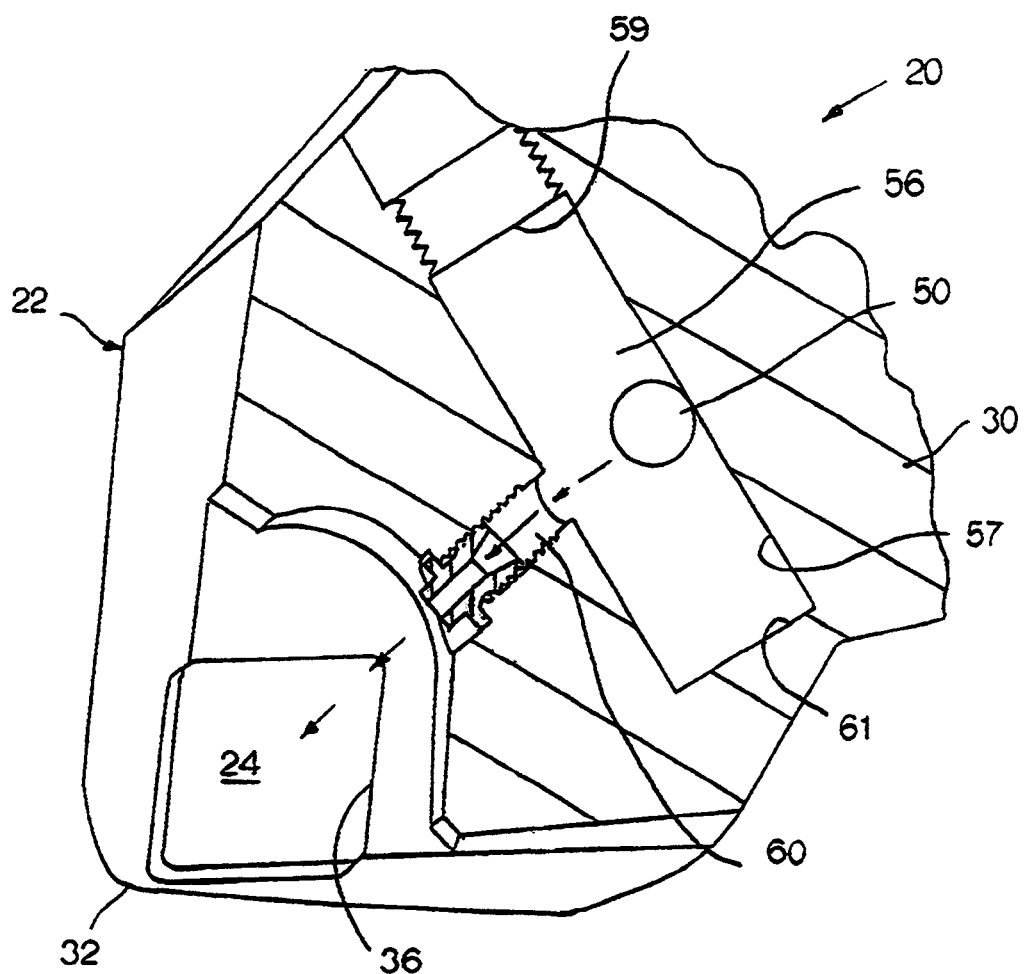
FIG. 2C is a top cross-sectional view of the joinder of the coolant chamber with the upstream coolant passage and the joinder between the coolant chamber and the downstream coolant passage of the cutting assembly of FIG. 1

Referring to the drawings, one specific embodiment of a cutting assembly, which is generally designated as 20, is illustrated in FIGS. 1, 2-2C. Cutting assembly 20 comprises a tool holder generally designated as 22 and a cutting insert generally designated as 24. The tool holder may be of one of many different kinds of tool holder structures, provided that the tool holder contains the internal coolant delivery features of the invention. The specific kind of tool holder depends upon the specific cutting (or material removal) application. The cutting insert can be any one of many geometries of a cutting insert depending upon the specific cutting (or material removal) application.

Still referring to the specific embodiment illustrated in FIGS. 1, 2, 2A and 2B, the tool holder 22 comprises a tool holder body 30 that has an axial forward end 32 and an axial rearward end 34. The tool holder body 30 contains a pocket 36 at the axial forward end 32 thereof. The pocket 36 is adapted to receive and facilitate the retention of the cutting insert 24 to the tool holder body 30. The tool holder body 30 contains a coolant inlet 40, which is operatively connected to a source of pressurized coolant 42 through a line 44 shown in schematic in FIG. 2. An internal coolant conduit 46 connects the coolant inlet 40 to an upstream coolant passage 50. A plug 70 seals the distal end of the upstream coolant passage 50.

The tool holder 22 contains a coolant chamber 56. The coolant chamber 56 is cylindrical in shape (e.g., generally arcuate in shape). Coolant chamber 56 has a cylindrical wall 57 and opposite flat ends 59 and 61. As illustrated in FIG. 1, coolant chamber 56 has a central longitudinal axis D-D. It is important to the function of the coolant chamber 56 to have a cylindrical shape or a shape that provides for the gradual redirection of the coolant flow entering into the coolant chamber 56 and the coolant flow exiting the coolant chamber 56. Coolant enters the coolant chamber 56 through the upstream coolant passage 50. The upstream coolant passage 50 has a central longitudinal upstream coolant passage axis A-A (see FIG. 2A). Coolant chamber 56 has a central region generally designated as 58. The central region 58 is essentially the center portion or volume of the coolant chamber 56.

As shown particularly in FIGS. 2A and 2B, the upstream coolant passage 50 has an orientation relative to the coolant chamber 56 such that the upstream coolant passage 50 opens or enters into the coolant chamber 56 so that the central longitudinal upstream coolant passage axis A-A is offset from the central region 58 of the coolant chamber 56. The upstream coolant passage 50 has a tangential relationship with the adjacent portion of the coolant chamber 56 wall 57. Further, when viewed in the direction of the central longitudinal upstream coolant passage axis A-A, the central longitudinal upstream coolant passage axis A-A of the upstream coolant passage 50 is generally perpendicular to the central longitudinal axis D-D of the coolant chamber 56. The nature of the orientation of the upstream coolant passage 50 relative to the coolant chamber 56 is such that the upstream coolant passage 50 directs coolant flow into the coolant chamber 56 in a tangential fashion. By directing coolant flow in a tangential manner, coolant does not abruptly impinge the surface of the coolant chamber 56. Instead, the coolant travels along the cylindrical wall of the coolant chamber 56, and by doing so, the direction of the coolant flow is gradually and smoothly redirected toward a downstream coolant passage 60. The smooth redirection of the coolant flow increases the efficiency of the delivery of coolant to the cutting insert.

The downstream coolant passage 60 directly receives coolant from the coolant chamber 56 and thereby provides for the flow of coolant toward the nozzle 64, which is affixed to the distal end of the downstream coolant passage 60. There should be an appreciation that the downstream coolant passage 60 has a threaded region at the distal end via which the nozzle 64 typically threadedly connects to the tool holder body 30 so as to provide a nozzle outlet through which coolant sprays or ejects toward the cutting insert 24. The coolant spray is designated as CF in FIG. 2.

The downstream coolant passage 60 has a central longitudinal downstream coolant passage axis B-B (see FIG. 2A). As described above, the coolant chamber 56 has a central region generally designated as 58, and which is essentially the center portion or volume of the coolant chamber 56. As shown particularly in FIG. 2A, the downstream coolant passage 60 has an orientation relative to the coolant chamber 56 such that the downstream coolant passage 60 communicates with the coolant chamber 56 so that the central longitudinal downstream coolant passage axis B-B is offset from the central region 58 of the coolant chamber 56. The downstream coolant passage 60 has a tangential relationship with the adjacent portion of the coolant chamber 56 wall 57. Further, when viewed in the direction of the central longitudinal downstream coolant passage axis B-B, the central longitudinal downstream coolant passage axis B-B of the downstream coolant passage 60 is generally perpendicular to the central longitudinal axis D-D of the coolant chamber 56. The nature of the orientation of the downstream coolant passage 60 relative to the coolant chamber 56 is such that the downstream coolant passage 60 provides for coolant exit from the coolant chamber 56 in a tangential manner.

Referring to FIG. 2B, the coolant flow is shown by arrows. The coolant flows under pressure through the upstream coolant passage 50 where it enters into the coolant chamber 56. As described above, the upstream coolant passage 50 is offset from the central region 58 of the coolant chamber 56 so as to experience a tangentially-oriented flow of coolant. In other words, the coolant entering the coolant chamber 56 via the upstream coolant passage 50 does so at a tangent to the cylindrical wall that defines the cylindrical coolant chamber 56 in that the vector of the coolant flow is in a direction generally tangent to the wall defining the coolant chamber 56, and this type of coolant flow results in the generation of a swirling or vortex-like effect within the coolant chamber 56. Upon the coolant encountering the arcuate shape of the coolant chamber wall 57, the wall 57 redirects the coolant flowing into the coolant chamber 56 in such a direction so that coolant flows directly into the downstream coolant passage 60.

The cylindrical wall will gradually and not abruptly redirect the coolant flow around the contour of the wall defining the coolant chamber 56 and towards the opening to the downstream coolant passage 60. As described above, the downstream coolant passage 60 is offset relative to the central region 58 of the coolant chamber 56 so as to directly receive a tangentially-oriented flow of coolant. In other words, the coolant that directly enters the downstream coolant passage 60 flows in a direction generally tangent to the wall defining the coolant chamber 56. As can be appreciated, this kind of coolant flow in a tangential fashion results in a smooth and efficient redirection of the coolant from the upstream coolant passage 50 entering into the coolant chamber 56 and exiting the coolant chamber 56 into the downstream coolant passage 60. Flowing coolant that does not enter into the downstream coolant passage 60 will be directed by the cylindrical wall defining the coolant chamber 56 back into the entering coolant stream and will flow in a direction generally tangent to the coolant chamber 56 wall whereby this coolant will directly enter into the downstream coolant passage 60.

Figure 3:
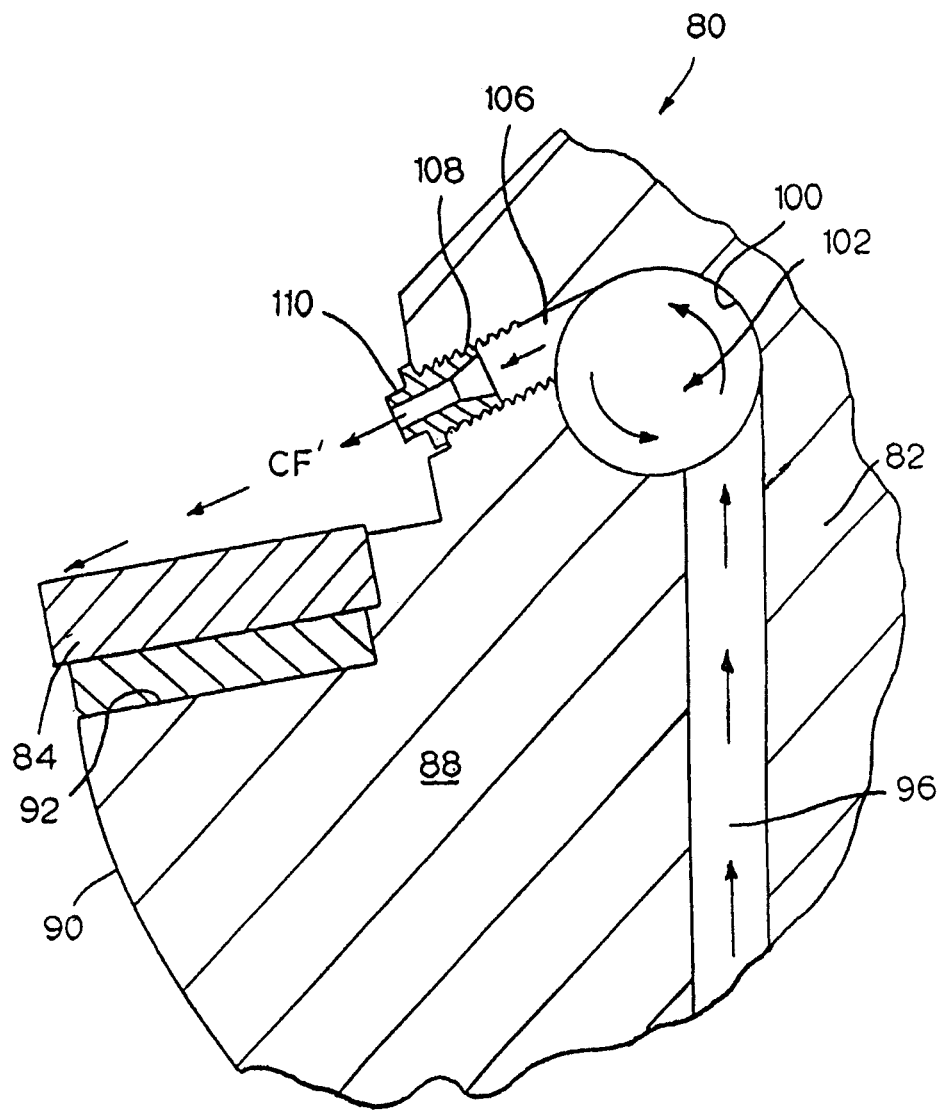
FIG. 3 is a cross-sectional view of another specific embodiment of a cutting assembly comprising a tool holder with a cutting insert attached thereto wherein the tool holder has three nozzles that deliver coolant to the cutting insert.
Figure 3A:
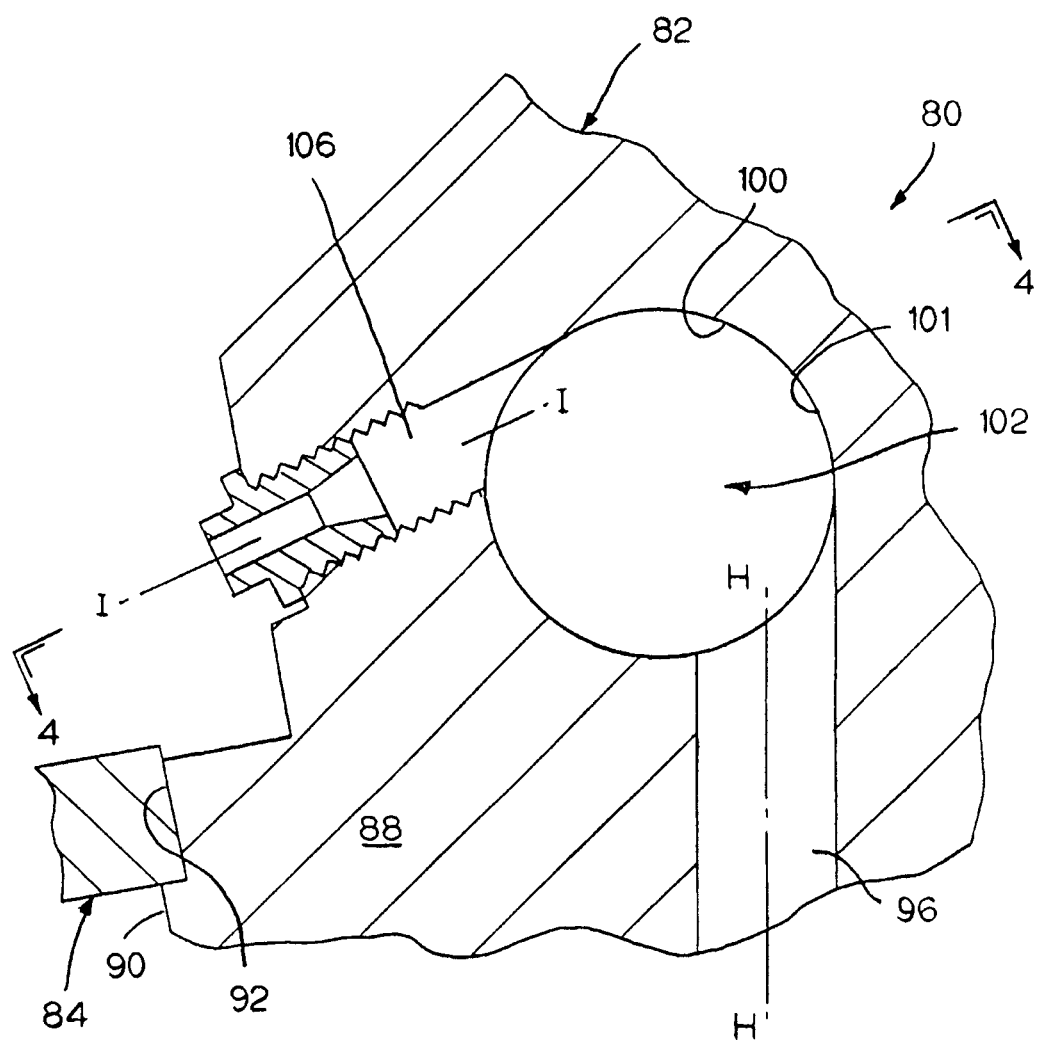
FIG. 3A is an enlarged cross-sectional view of the joinder of the coolant chamber with the upstream coolant passage and the joinder between the coolant chamber and the downstream coolant passage of the cutting assembly of FIG. 3.
Figure 4:
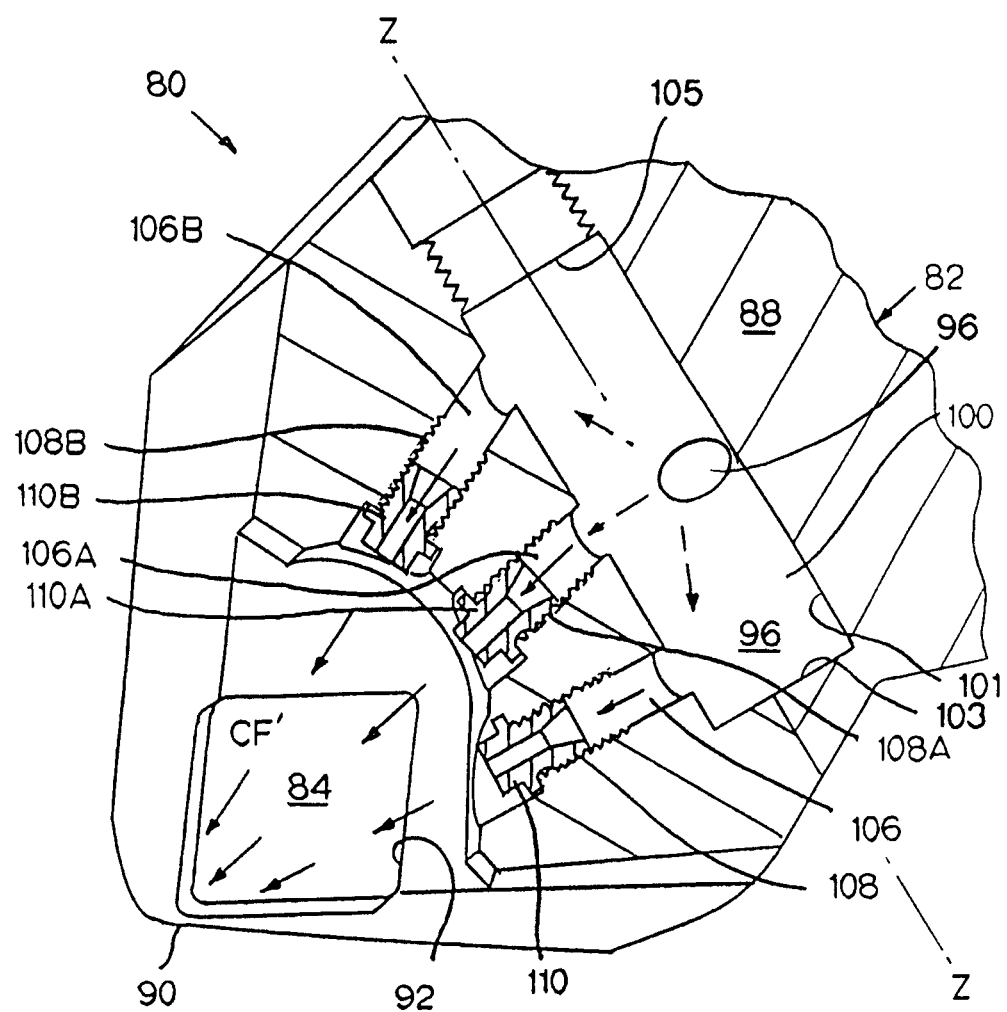
FIG. 4 is a cross-sectional view of the cutting assembly of FIG. 3 taken along section line 4-4 of FIG. 3A.

Still referring to the drawings, FIGS. 3, 3A and 4 illustrate another specific embodiment of a cutting assembly generally designated as 80. The cutting assembly 80 comprises a tool holder generally designated as 82 and a cutting insert 84. The tool holder may be of one of many different kinds of tool holder structures, provided that the tool holder contains the internal coolant delivery features of the invention. The specific kind of tool holder depends upon the specific cutting (or material removal) application. The cutting insert can be any one of many geometries of a cutting insert depending upon the specific cutting (or material removal) application.

The tool holder 82 comprises a tool holder body 88 that has an axial forward end 90 and an axial rearward end, which is not illustrated. The tool holder body 88 contains a pocket 92 at the axial forward end 90. The pocket 92 is adapted to carry and facilitate the retention of the cutting insert 84 to the tool holder body 88.

An upstream coolant passage 96 provides communication for the coolant to enter the coolant chamber 100. The coolant chamber 100 has a cylindrical wall (or surface) 101 and opposite flat ends (103, 105). Coolant chamber 100 has a central longitudinal axis Z-Z. The upstream coolant passage 96 has a central longitudinal upstream coolant passage axis H-H (see FIG. 3A). Coolant chamber 100 has a central region generally designated as 102. The central region 102 is essentially the center portion or volume of the coolant chamber 100. As shown particularly in FIG. 3A, the upstream coolant passage 96 has an orientation relative to the coolant chamber 100 such that the upstream coolant passage 96 opens or enters into the coolant chamber 100 so that the central longitudinal upstream coolant passage axis H-H is offset from the central region 102 of the coolant chamber 100. Further, when viewed in the direction of the central longitudinal upstream coolant passage axis H-H, the central longitudinal upstream coolant passage axis H-H of the upstream coolant passage 96 is generally perpendicular to the central longitudinal axis Z-Z of the coolant chamber 100. The nature of the orientation of the upstream coolant passage 96 relative to the coolant chamber 100 is such that the upstream coolant passage 96 directs coolant flow into the coolant chamber 100 in a tangential manner. By directing coolant flow in a tangential manner, coolant does not abruptly impinge the surface of the coolant chamber 100. Instead, the coolant travels along the cylindrical wall 101 of the coolant chamber 100, and by doing so, the direction of the coolant flow is gradually and smoothly redirected toward a downstream coolant passage 106. The smooth redirection of the coolant flow increases the efficiency of the delivery of coolant to the cutting insert. By directing coolant flow in a tangential manner, the amount of turbulence of coolant is decreased thereby increasing the efficiency of the delivery of coolant to the cutting insert.

In this specific embodiment, there are three downstream coolant passages (106, 106A, 106B). Each one of the downstream coolant passages (106, 106A, 106B) receives coolant from the coolant chamber 100 and provides for coolant flow to its corresponding nozzle (110, 100A, 110B) which is affixed to the distal end of each downstream coolant passage (106, 106A, 106B). There should be an appreciation that each downstream coolant passage (106, 106A, 106B) has a threaded region (108, 108A, 108B) at the distal end via which each one of the nozzles (110, 110A, 110B) typically threadedly connects to the tool holder body 88 so as to provide a nozzle outlet through which coolant sprays or ejects toward the cutting insert 84. The coolant spray is designated as CF' in FIG. 3.

The description of the downstream coolant passage 106 will suffice for the description of the other two downstream coolant passages 106A and 106B. In this regard, downstream coolant passage 106 has a central longitudinal downstream coolant passage axis I-I. As described above, the coolant chamber 100 has a central region generally designated as 102, and which is essentially the center portion or volume of the coolant chamber 100. As shown particularly in FIG. 3A, the downstream coolant passage 106 has an orientation relative to the coolant chamber 100 such that the downstream coolant passage 106 communicates with the coolant chamber 100 so that the central longitudinal downstream coolant passage axis I-I is offset from the central region 102 of the coolant chamber 100. Further, when viewed in the direction of the central longitudinal downstream coolant passage axis I-I, the central longitudinal downstream coolant passage axis I-I of the downstream coolant passage 106 is generally perpendicular to the central longitudinal axis Z-Z of the coolant chamber 100. The nature of the orientation of the downstream coolant passage 106 relative to the coolant chamber 100 is such that the downstream coolant passage 106 provides for coolant exit from the coolant chamber 100 in a tangential manner. The description of the coolant flow for the first specific embodiment of the cutting assembly 20 applies to the coolant flow for this specific embodiment of cutting assembly 80.

In the specific embodiment of FIGS. 3, 3A and 4, the upstream coolant passage 96 has a tangential relationship with the adjacent portion of the coolant chamber 100 wall 101. Further, the downstream coolant passages (106, 106A, 106B) each have a tangential relationship with the respective adjacent portions of the coolant chamber 100 wall 101.

In this specific embodiment, there should be an appreciation that the upstream coolant passage 96 is centrally located midway between the lateral downstream coolant passage 106 and 106 B so as to provide for a balanced evenly distributed coolant delivery between each of the downstream coolant passage 106, 106A and 106B. The coolant chamber 100 is cylindrical in shape with a cylindrical wall 101 and opposite flat ends (103, 105) whereby the flat ends provide for improved coolant flow with less turbulence. Further, the lateral downstream coolant passages 106 and 106B are disposed away from the flat ends of the coolant chamber 100 so as to permit coolant to flow into the lateral downstream coolant passages 106 and 106B from both sides thereof. In other words, the flat walls 103, 105 do not block or impede coolant flow into the lateral downstream coolant passages 106 and 106 B.

Figure 5:
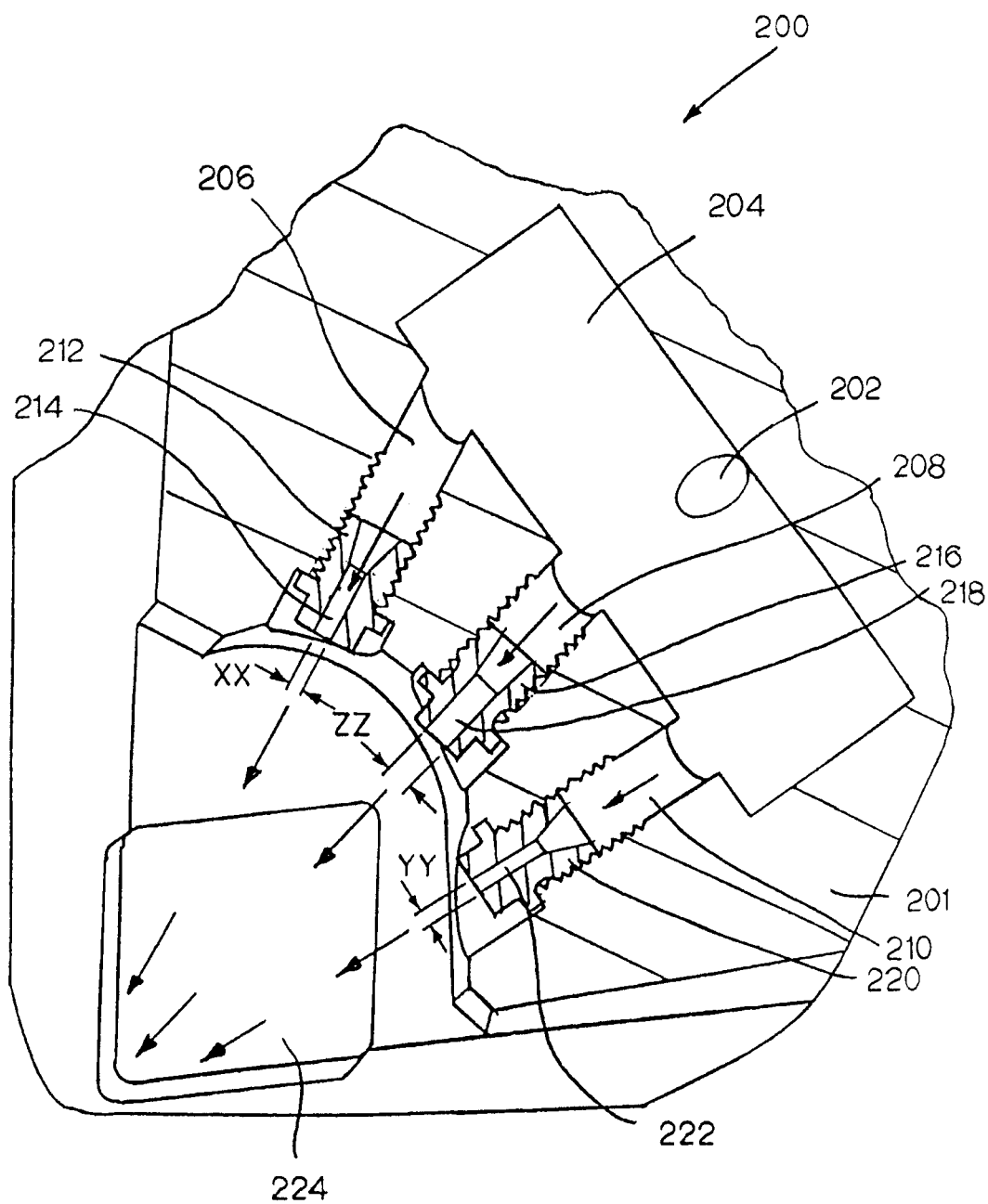
FIG. 5 is a top cross-sectional view of another specific embodiment and the joinder of the coolant chamber with the upstream coolant passage and the joinder between the coolant chamber and the downstream coolant passage wherein the central nozzle has a large passage than the coolant passage in either of the two lateral nozzles.

In still another specific embodiment, FIG. 5 shows a cutting assembly 200 that has a tool holder 201. The tool holder 201 contains an upstream coolant passage 202 which directs coolant into a coolant chamber 204. The coolant chamber 204 is cylindrical in shape. There are a trio of downstream coolant passages (206, 208, 210) that receive coolant from the coolant chamber 204. One lateral nozzle 212 attaches to the distal end of the downstream coolant passage 206 wherein lateral nozzle 212 has a coolant passage 214 with a dimension YY. Another lateral nozzle 220 attaches to the distal end of the downstream coolant passage 210 wherein lateral nozzle 220 has a coolant passage 222 with a dimension XX. In this specific embodiment, the dimensions XX and YY are essentially equal to each other. The central nozzle 216 attaches to the distal end of the downstream coolant passage 208 wherein central nozzle 216 has a coolant passage 218 with a dimension ZZ. In this specific embodiment, dimension ZZ is greater than each of dimensions XX and YY. The coolant flows toward the cutting insert 224. In this specific embodiment, supplying a greater volume of coolant through the central nozzle 216 facilitates the cooling of the cutting insert and the breaking of the chip at the interface between the cutting insert and the workpiece.

Turning tests were conducted to evaluate specific embodiments of the tool holder, and the test results are set forth below. The testing was performed on a Ti6Al4V titanium alloy workpiece using an uncoated cemented (low cobalt) fine grained tungsten carbide cutting insert. The testing was conducted under the following parameters: VC=100 meters/minute; f=0.2 mm; ap=2 mm/4 mm; Wear Criteria=0.300 mm. The test set up comprised a Beohringer machine, and the coolant pressure=80 bar. Tables 1 and 2 set out the test results on the Ti6Al4V titanium alloy workpiece wherein Table 1 and Table 2 each set forth the results when the depth of cut was 2 mm.

TABLE 1

Test Results on Ti6Al4V titanium alloy workpiece with depth of cut equal to 2 mm

| Parameter | Sample | | | |
|---|---|---|---|---|
| | 34 (conventional) | 34 (conventional) | 35 (inventive) | 35 (inventive) |
| Tool life (min) | 4 | 3 | 4 | 4 |
| Max. Wear (mm) | 0.507 | 0.338 | 0.301 | 0.345 |
| Q (liters/min) | 27.0 | 27.0 | 28.05 | 28.05 |
| Nozzle | 3 × 1.4 mm | 3 × 1.4 mm | 3 × 1.4 mm | 3 × 1.4 mm |

Referring to the results set forth in Table 1, two tests used tool holder Sample 34, which contained a conventional coolant chamber that did not exhibit the tangential flow feature. In other words, the coolant entered the coolant chamber more in the center of the coolant chamber. The tool holder of Sample 34 was in contrast to the tool holder of Sample 35, which exhibited the tangential flow feature of the invention. Each tool holder used three nozzles wherein each nozzle had a nozzle passage with a diameter equal to 1.4 mm. The three nozzles sprayed coolant toward the vicinity of the interface between the cutting insert and the workpiece.

Table 1 shows that the tool life of the cutting inserts held by the Sample 35 tool holder, which used the inventive coolant chamber, was greater than the tool life of cutting inserts held by the Sample 34 tool holder. Sample 35 tool holder (inventive) also resulted in less maximum wear on the cutting inserts held thereby than the cutting inserts held by the Sample 34 tool holder (conventional). In this regard, the average maximum wear in millimeters for the cutting inserts held by Sample 35 tool holder was 0.323 mm as compared to the average maximum wear for the cutting inserts held by the Sample 34 tool holder equal to 0.424 mm.

The Sample 35 tool holder (inventive) also delivered a greater volume of coolant to the cutting inserts than did the Sample 34 tool holder (conventional). In this regard, the average coolant flow for the Sample 35 tool holder was 28.05 liters per minute while the average coolant flow for the Sample 34 tool holder was 27.0 liters per minute. It is apparent that the Sample 35 tool holder, which is the inventive tool holder, provides for greater coolant delivery toward the vicinity of the interface between the cutting insert and the workpiece than does the Sample 34 tool holder. The cutting inserts held by the inventive Sample 35 tool holder experienced less maximum wear and a greater tool life than the cutting inserts held by the conventional Sample 34 tool holder.

TABLE 2

Test Results on Ti6Al4V titanium alloy workpiece with depth of cut equal to 2 mm

| Parameter | Sample | | | |
|---|---|---|---|---|
| | 32-1 | 32-2 | 32-3 | 32-4 |
| Tool life (min) | 4 | 4 | 5 | 4 |
| Max. Wear (mm) | 0.403 | 0428 | 0.450 | 0.385 |
| Q (liters/min) | 27.75 | 27.73 | 21.3 | 21.3 |
| Nozzle | 3 × 1.4 mm | 3 × 1.4 mm | 1.0 mm 1.4 mm 1.0 mm | 1.0 mm 1.4 mm 1.0 mm |

In reference to the test results set forth in Table 2, the tool holders represented by Samples 32-1 through 32-4 used conventional coolant chambers, but the difference between the tool holders of Samples 32-1 and 32-2 and the tool holders of Samples 32-3 and 32-4 resided in the nozzle arrangements. In this regard, the nozzle arrangement for Samples 32-1 and 32-2 comprised three nozzles each having a nozzle passage with a 1.4 mm diameter wherein the nozzles were directed for coolant delivery toward the vicinity of the interface between the cutting insert and the workpiece. The nozzle arrangement for Samples 32-3 and 32-4 comprised a central nozzle with a 1.4 mm diameter nozzle passage and a lateral nozzle on each side of the central nozzle wherein each lateral nozzle had a diameter equal to 1.0 mm and the nozzles were directed for coolant delivery toward the vicinity of the interface between the cutting insert and the workpiece.

A comparison of the tool life of the cutting inserts held by these tool holders shows that the use of the nozzle arrangement using the central nozzle (1.4 mm diameter) and two lateral nozzles (1.0 mm diameter) (i.e., Samples 32-3 and 32-4) resulted in a longer tool life for the cutting inserts held thereby than the tool life for the cutting inserts held by the tool holders (Samples 32-1 and 32-2) using three nozzles, each of which had a diameter equal to 1.4 mm. The average maximum wear was about the same for the cutting inserts held by each of Samples 32-1/32-2 and Samples 32-3/32-4. Yet, the coolant delivered to the vicinity of the interface between the cutting insert and the workpiece was less for the tool holder with the nozzle arrangement using the central nozzle (1.4 mm diameter) and two lateral nozzles (1.0 mm diameter) (i.e., Samples 32-3 and 32-4) than for the tool holder using the nozzle arrangement comprising three nozzle of the 1.4 mm diameter (i.e., Samples 32-1 and 32-2). More specifically, the average coolant delivered to the vicinity of the interface between the cutting insert and the workpiece using Samples 32-3 and 32-4 was equal to 21.3 liters per minute in contrast to the average coolant volume of 27.74 liters per minute. It can be seen that the use of a tool holder with the nozzle arrangement using the central nozzle (1.4 mm diameter) and two lateral nozzles (1.0 mm diameter) (i.e., Samples 32-3 and 32-4) resulted in generally similar tool life for the cutting inserts with using less coolant than the tool holders using the nozzle arrangement comprising three nozzles each with a diameter equal to 1.4 (i.e., Samples 32-1 and 32-2).

Overall, with regard to the use of the inventive coolant chamber, it can be seen that the Sample 35 tool holder, which is the inventive tool holder, provides for greater coolant delivery toward the vicinity of the interface between the cutting insert and the workpiece than does the Sample 34 tool holder. The cutting inserts held by the inventive Sample 35 tool holder experience less maximum wear and a greater tool life than the cutting inserts held by the conventional Sample 34 tool holder. In reference to a comparison of the nozzle assemblies, it is apparent that the use of a tool holder with the nozzle arrangement using the central nozzle (1.4 mm diameter) and two lateral nozzles (1.0 mm diameter) (i.e., Samples 32-3 and 32-4) resulted in generally similar tool life for the cutting inserts with using less coolant than the tool holders using the nozzle arrangement comprising three nozzles each with a diameter equal to 1.4 (i.e., Samples 32-1 and 32-2). There is the contemplation that the use of a tool holder using the inventive coolant chamber along with the nozzle arrangement using the central nozzle (1.4 mm diameter) and two lateral nozzles (1.0 mm diameter) (i.e., Samples 32-3 and 32-4) would result in an improvement of tool life of the cutting insert along with improved coolant delivery efficiencies.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed:

1. A tool holder for carrying a cutting insert wherein the cutting insert is useful for the removal of material during a material removal operation, the tool holder comprising:
    a tool holder body comprising: a pocket adapted to carry the cutting insert, a coolant inlet in communication with a pressurized source of coolant, a coolant chamber having a central region, an upstream coolant passage having a central longitudinal upstream coolant passage axis;
    a plurality of downstream coolant passages wherein each downstream coolant passage has a central longitudinal downstream coolant passage axis, each of the downstream coolant passages terminating in an opening; and
    the upstream coolant passage opening into the coolant chamber, and the upstream coolant passage having an orientation relative to the coolant chamber so that the central longitudinal upstream coolant passage axis is offset from the central region of the coolant chamber whereby coolant flows into the coolant chamber in a tangential fashion;
    wherein each of the downstream coolant passages receives coolant from the coolant chamber, and each of the downstream coolant passages having an orientation relative to the coolant chamber so that the central longitudinal downstream coolant passage axis of each downstream coolant passage is offset from the central region of the coolant chamber whereby coolant flows into each one of the downstream coolant passages in a tangential fashion; and
    wherein the coolant chamber is defined by a coolant chamber wall wherein at least a portion of the coolant chamber wall is a generally arcuate wall portion that redirects coolant flowing into the coolant chamber so as to directly enter each one of the downstream coolant passages.

2. The tool holder according to claim 1 wherein the coolant chamber is cylindrical in shape, and the coolant chamber having a cylindrical wall and two opposite flat end walls.

3. The tool holder according to claim 2 wherein the upstream coolant passage opening into the coolant chamber at a location approximately mid-way between the opposite flat walls.

4. The tool holder according to claim 2 wherein the upstream coolant passage has a tangential relationship with the adjacent portion of the coolant chamber wall, and each of the downstream coolant passages has a tangential relationship with the adjacent portions of the coolant chamber wall.

5. The tool holder according to claim 2 comprising a central downstream coolant passageway, and one lateral downstream coolant passageway on one side of the central downstream coolant passageway and another lateral downstream coolant passageway on the other side of the central downstream coolant passageway.

6. The tool holder according to claim 5 wherein the one lateral downstream coolant passage being spaced apart from one adjacent flat end wall, and the other lateral downstream coolant passage being spaced apart from other adjacent flat end wall, and the central downstream coolant passage being mid-way between the flat end walls.

7. A tool holder for carrying a cutting insert wherein the cutting insert is useful for the removal of material during a material removal operation, the tool holder comprising:
    a tool holder body comprising: a pocket adapted to carry the cutting insert, a coolant inlet in communication with a pressurized source of coolant, a coolant chamber having a central region, an upstream coolant passage having a central longitudinal upstream coolant passage axis;
    a central downstream coolant passageway having a central nozzle attached thereto wherein the central nozzle has a central nozzle passage, and one lateral downstream coolant passageway on one side of the central downstream coolant passageway and the one lateral downstream coolant passage having one lateral nozzle attached thereto wherein the one lateral nozzle has a one lateral nozzle passage, and another lateral downstream coolant passageway on the other side of the central downstream coolant passageway and the another lateral downstream coolant passage having other nozzle attached thereto wherein the other lateral nozzle having other nozzle passage;

the upstream coolant passage opening into the coolant chamber, and the upstream coolant passage having an orientation relative to the coolant chamber so that the central longitudinal upstream coolant passage axis is offset from the central region of the coolant chamber whereby coolant flows into the coolant chamber in a tangential fashion.

\* \* \* \* \*